(12) United States Patent
Yip et al.

(10) Patent No.: US 7,827,199 B2
(45) Date of Patent: Nov. 2, 2010

(54) CENTRALIZED CONFIGURATION DATA MANAGEMENT FOR DISTRIBUTED CLIENTS

(75) Inventors: Ying-Kin Tony Yip, Kirkland, WA (US); Maximiliano Maccanti, Redmond, WA (US); Baskaran Dharmarajan, Bellevue, WA (US); Walter Oliver, Sammamish, WA (US); Claudia Irene Bond, Redmond, WA (US); Scott M. Anson, Redmond, WA (US); Juanya Davon Williams, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 12/101,746

(22) Filed: Apr. 11, 2008

(65) Prior Publication Data

US 2008/0196107 A1 Aug. 14, 2008

Related U.S. Application Data

(62) Division of application No. 10/820,181, filed on Apr. 6, 2004, now Pat. No. 7,383,271.

(51) Int. Cl.
G06F 17/00 (2006.01)
(52) U.S. Cl. .................. 707/791; 707/802; 707/822; 707/828
(58) Field of Classification Search .......... 707/600–831
See application file for complete search history.

(56) References Cited

U.S. PATENT DOCUMENTS

| | | | |
|---|---|---|---|
| 5,838,918 A | 11/1998 | Prager et al. | |
| 6,259,448 B1 | 7/2001 | McNally et al. | |
| 6,308,208 B1 | 10/2001 | Jung et al. | |
| 6,477,572 B1 | 11/2002 | Elderton et al. | |
| 6,480,955 B1 | 11/2002 | DeKoning et al. | |
| 6,487,584 B1 | 11/2002 | Bunney | |
| 6,549,932 B1 | 4/2003 | McNally et al. | |
| 6,553,403 B1 | 4/2003 | Jarriel et al. | |
| 6,640,239 B1 | 10/2003 | Gidwani | |
| 6,662,205 B1 | 12/2003 | Bereiter | |
| 6,687,743 B1 | 2/2004 | Innes | |
| 6,871,279 B2 | 3/2005 | Sames et al. | |
| 6,931,523 B1 | 8/2005 | Tomoson et al. | |
| 6,985,955 B2 | 1/2006 | Gullotta et al. | |

(Continued)

OTHER PUBLICATIONS

Subramanyan et al., "A Scalable SNMP-Based Distributed Monitoring System for Heterogeneous Network Computing," Proceedings of the 2000 ACM/IEEE Conference on Supercomputing (CDROM), 2000, pp. 1-9, Article No. 14, IEEE Computer Society, Washington, D.C, USA.

(Continued)

Primary Examiner—Isaac M Woo
(74) Attorney, Agent, or Firm—Senniger Powers LLP

(57) ABSTRACT

System and method for managing a plurality of clients. A request to implement a change in configuration data is received from a user. The configuration data relates to an operation of a client. The received request is stored in a memory area. Computer-executable instructions request topology data from the memory area based on the configuration data to identify the client. The requested topology data is received from the memory area. Computer-executable instructions identify a notification service associated with the client and notify the identified notification service of the change in the configuration data.

8 Claims, 6 Drawing Sheets

U.S. PATENT DOCUMENTS

| | | |
|---|---|---|
| 7,073,195 B2 | 7/2006 | Brickell et al. |
| 7,127,460 B2 | 10/2006 | Nixon et al. |
| 2003/0009552 A1 | 1/2003 | Benfield et al. |
| 2003/0149756 A1 | 8/2003 | Grieve et al. |
| 2004/0031030 A1 | 2/2004 | Kidder et al. |
| 2004/0059813 A1 | 3/2004 | Bolder et al. |
| 2005/0071754 A1 | 3/2005 | Morgan et al. |
| 2005/0114315 A1* | 5/2005 | Tanner et al. .................. 707/3 |

OTHER PUBLICATIONS

Lutfiyya et al., "Configuration Maintenance for Distributed Applications Management," Proceedings of the 1997 Conference of the Centre for Advanced Studies on Collaborative Research, 1997, pp. 1-15, IBM Press, Canada.

Kahani et al., "Decentralised Approaches for Network Management," ACM SIGCOMM Computer Communication Review, Jul. 1997, pp. 36-47, vol. 27, Issue 3, ACM Press, New York, USA.

Goldszmidt et al., "Network Management by Delegation: the MAD Approach," Proceedings of the 1991 Conference of the Centre for Advanced Studies on Collaborative Research, 1991, pp. 347-361, IBM Press, Canada.

* cited by examiner

CENTRALIZED CONFIGURATION DATA MANAGEMENT FOR DISTRIBUTED CLIENTS

TECHNICAL FIELD

Embodiments of the present invention relate to the field of managing a plurality of clients. In particular, embodiments of the present invention relate to managing configuration data of a client, wherein the configuration data defines an operation of the client.

BACKGROUND OF THE INVENTION

In existing network environments, managing a client (e.g., a server, service, application program, or operating system component) involves managing configuration data stored on the client. In one example, a large number of different servers often host a variety of different services (e.g., web services, soap services, and/or operating system services). A server hosting a particular service usually stores thereon configuration data (e.g., software settings, operational parameters, service uniform resource locators (URLs), data retention policies, and site properties). Such configuration data defines an operation of the server in hosting the particular service. For example, the configuration data may determine an operational state of the server (i.e., whether the server is executing a service) as well as when and how a service is executed on the server.

As the network environment grows increasingly larger, managing or organizing a relationship among different clients and/or configuration data also becomes an increasingly complex task. For example, there may be a number of service classes, wherein a service class defines a set of services executable on a particular server (e.g., registration service and member center service may be part of the same service class). A group of servers may also be defined to execute one or more services belonging to a particular service class. Accordingly, servers belonging to this group of servers may share certain configuration data and other settings in order to provide a uniform and integrated service. As can be seen, managing configuration data (e.g., changing/overriding, adding/removing, and viewing the configuration data) across different server groups or service classes can be a challenging task.

In prior systems and methods, managing configuration data involves manually managing the configuration data of a particular client. For example, in prior systems and methods, an administrator would change configuration data by manually identifying one or more clients affected by a change in the configuration data and then manually updating the configuration data in the identified clients one by one. Such prior systems and methods create substantial operational problems for network administrators. First, a large number of files, data access methods, and tools are frequently needed to manipulate configuration data across different clients. This results in a difficulty to track, schedule, and execute configuration data changes, and requires a great understanding of the network environment in order to identify the affected clients. Second, the prior systems and methods do not have a simple way to select a large group of clients, schedule a one-time or recurring configuration data change, and then uniformly apply the configuration data change to the large group of clients. In particular, managing clients and performing configuration data changes to a large group of clients require many manual steps. Third, the prior systems and methods do not attempt to keep track of an operation of a particular client. Therefore, changing configuration data in the previous systems often involves manually applying configuration data changes to a large group of clients, when in reality a smaller group of clients should have been affected by the changes. This creates inconsistency in managing configuration data and further wastes valuable network resources.

Another disadvantage of the prior systems and methods is the difficulty in keeping track of a configuration state of a particular client. Specifically, there lacks a system that identifies the clients in a network environment, their configuration states, and their operations. Additionally, the prior systems and methods do not provide consistent data versioning for configuration data and thus cannot identify and record a particular configuration state as a "complete" configuration state in order to support rollback or roll-forward of client configuration state. For example, when a change in configuration data adversely affects the behavior of a client, it is difficult and expensive to change the configuration state of the client to a previous "complete" configuration state. Adding to the difficulty to rollback or roll-forward a configuration state is a lack of support for auditing a sequence of changes to configuration data. This further results in inabilities to track changes that cause system instability, to monitor client performance, and to prevent conflicting configuration data changes.

Yet another disadvantage of the prior systems and methods is the ineffectiveness in controlling access to configuration data of a particular client. The prior systems and methods do not have an effective authorization system for controlling access to configuration data. Usually, an individual either is allowed to access and change configuration data or is denied access to the configuration data. As such, the prior systems and methods cannot provide flexibility in allowing an individual to change/override, add/remove, and view configuration data of a client or group of clients.

The prior systems and methods also lack knowledge of the rotation status of the servers/services in the system. Without knowing such rotation status, more than expected servers may be taken out of rotation for deployment and/or maintenance, which causes reduction of expected service availability. Further, the prior systems and methods lack a cache system that is directly available to individual clients. This means that in the previous systems and methods, some clients may be forced to build different sub-caches to store configuration data in different formats compatible with the sub-caches. This further causes waste of network and local system resources, inconsistent storage formats, and inefficiency in managing configuration data. In addition, the prior systems and methods lack a uniform centralized storage model and access interface. This causes additional development cost for designing, implementing, testing, and deploying the additional storage model and access interface.

Accordingly, a solution that seamlessly manages configuration data across different clients is desired to address one or more of these and other disadvantages.

SUMMARY OF THE INVENTION

Embodiments of the invention overcome one or more deficiencies in the known art by providing, among other things, a uniform system and method for managing a plurality of clients. In an embodiment, the invention effectively permits managing configuration data stored on a client by utilizing topology data stored in a memory area. In this embodiment, the topology data advantageously defines a relationship among different clients and/or configuration data. Embodiments of the invention further advantageously permit centrally managing configuration data across a large group of clients via an interface component. According to one or more embodiments of the invention, a scriptable application programming interface (API) serves as an interface between the interface component and the memory area and enables handling of requests to manage configuration data from the interface component. At least one embodiment of the invention also advantageously allows notifying a cache manager associated with one or more clients to execute a change in configuration data on the clients. Moreover, the features of embodiments of the present invention described herein are economically feasible, commercially practical, and easier to implement than currently available techniques.

Briefly described, a method employing aspects of the invention processes a configuration data change. The method includes receiving a request from a user to implement a change in configuration data. The configuration data relates to an operation of a client. The method also includes storing the received request in a memory area. The method also includes requesting topology data from the memory area based on the configuration data. The topology data defines a relationship between the client and the configuration data. The method further includes receiving the requested topology data from the memory area. The received topology data identifies the client. The method further includes identifying a notification service associated with the identified client. The method includes notifying the identified notification service of the change in the configuration data.

In another embodiment of the invention, a method employing aspects of the invention notifies a client of a change in configuration data. The method includes receiving a notification. The notification indicates a change in configuration data. The configuration data relates to an operation of the client. The method also includes obtaining a notification manifest from a memory area in response to the received notification. The notification manifest defines the change in the configuration data and specifies the client. The method further includes processing the obtained notification manifest to identify the client. The method further includes sending the notification manifest to the identified client.

In another embodiment of the invention, a method employing aspects of the invention applies a configuration data change to a client. The method includes receiving a notification manifest from a notification service. The received notification manifest defines a change in configuration data and specifies a client affected by the change in the configuration data. The method also includes processing the received notification manifest to identify the client. The method further includes determining a cache service associated with the identified client. The method further includes notifying the determined cache service of the change in the configuration data to effect the change on the client.

In further yet another embodiment of the invention, a system employing aspects of the invention manages a plurality of clients. The system includes a memory area adapted to store topology data. The topology data identifies a relationship between the plurality of clients. The system also includes a notification adapted to indicate a change in configuration data. The configuration data relates to an operation of at least one affected client from the plurality of clients. The system further includes a notification service adapted to search the memory area in response to the notification to identify the affected client based on the topology data and to notify the affected client of the change in the configuration data.

In further yet another embodiment of the invention, computer-readable media employing aspects of the invention have computer-executable components for performing a method to manage a plurality of clients. The computer-readable media include a configuration component to store topology data describing a relationship between the plurality of clients. The topology data further identifies a client affected by a change in configuration data. The configuration data relates to an operation of the client. The computer-readable media also include an interface component to receive a request to change the configuration data and to receive the topology data stored by the configuration component. The received topology data identifies the client affected by the change in the configuration data. The computer-readable media further include a notification component to notify the affected client of the change in the configuration data in response to the interface component receiving the request. The computer-readable media further include a cache managing component to execute the change in the configuration data on the affected client in response to the notification component notifying the affected client of the change in the configuration data.

One or more computer-readable media having computer-executable instructions for managing a plurality of clients embody further aspects of the invention.

Alternatively, one embodiment of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
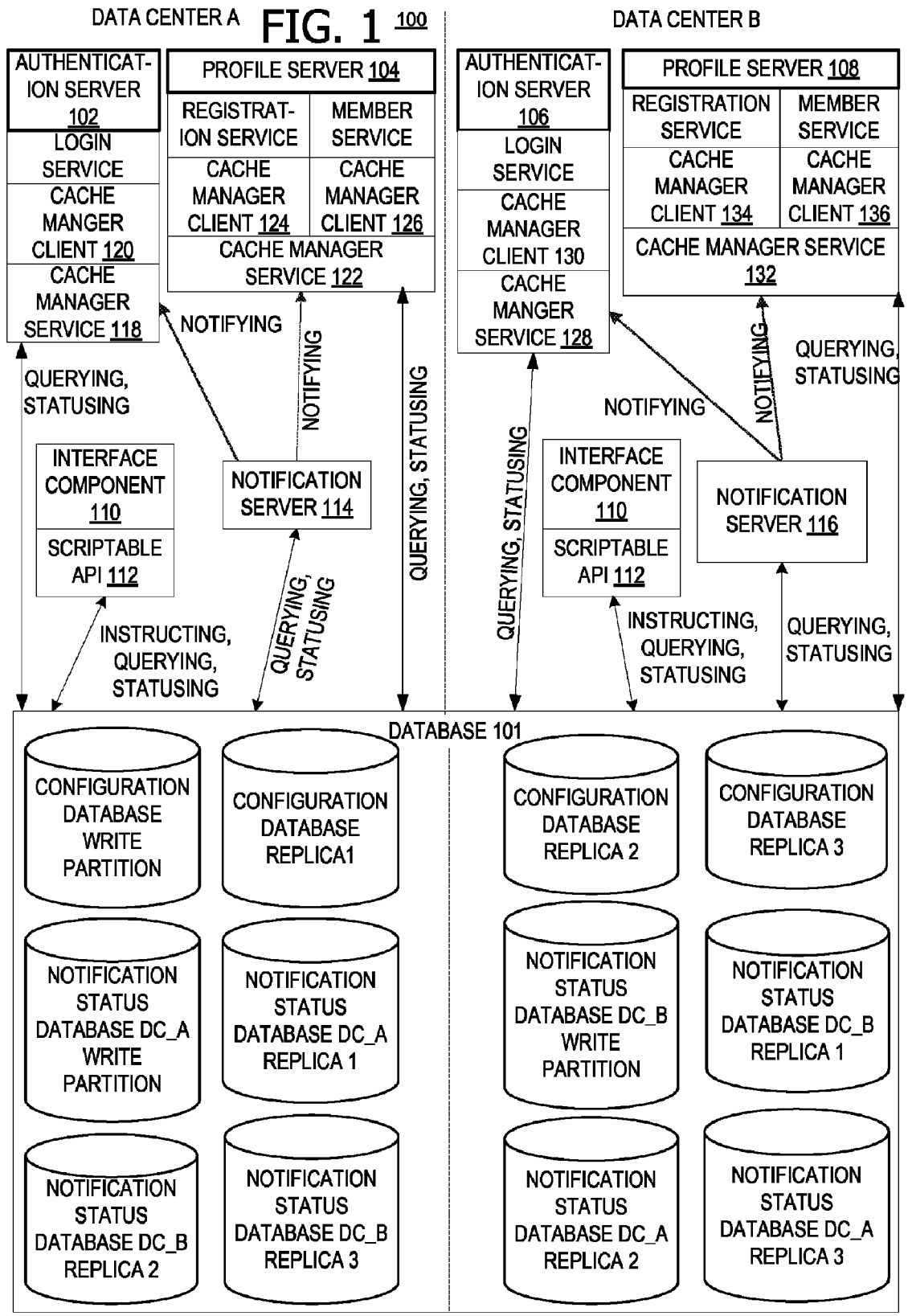
FIG. 1 is a block diagram of an exemplary embodiment of a configuration data management system according to the invention adapted to manage a plurality of clients.

FIG. 1 generally shows an exemplary environment 100 in which embodiments of the invention may be utilized. A memory area such as a database 101 is adapted to store topology data identifying a relationship among different clients and/or configuration data. For example, the database 101 may be a database such as described in a co-pending U.S. patent application entitled MANAGING CLIENT CONFIGURATION DATA application Ser. No. 10/819834 which is incorporated by reference herein. In general, the configuration data stored on a particular client defines an operation of the particular client. According to one embodiment of the invention, the client may be a server, a service, an application program, or an operating system component. In the following description of the invention, a server executing a service is used as a particular example of the client for illustration purposes.

In one embodiment of the invention, the topology data defines a service class, which is a set of services that may be executed on a particular server. The topology data may also define a server group, which is a set of servers that execute one or more services of a particular service class. According to another embodiment of the invention, a change in configuration data for a server group may affect one or more servers in the server group. Likewise, a change in configuration data for a service class may affect one or more services in the service class. In yet another embodiment of the invention, the topology data may also define a configuration override scenario. For example, if servers S1, S2, and S3 are part of server group G1, when configuration object C1 is assigned to the group G1, then the servers S1, S2, and S3 inherit the configuration object C1 from the group G1. But when configuration object CI1 (e.g., a different instance of the object C1) is assigned to the server S1, then the object C1 is overridden by the object CI1 in the server S1. In this case, a further change to the object C1 has no impact on the server S1.

As shown in FIG. 1, according to one exemplary embodiment of the invention, database 101 is divided into a number of partitions and replicas. Specifically, database 101 includes a configuration database write partition adapted to store the topology data. Database 101 also includes replicas of the configuration database write partition, namely, configuration database replicas 1, 2, and 3. According to an exemplary embodiment of the invention, the configuration database write partition and the configuration database replica 1 is allocated to data center A, and the configuration database replicas 2 and 3 are allocated to data center B.

In one embodiment of the invention, a change or update made to a particular configuration database is reflected in the other configuration databases.

Database 101 also includes one or more notification status databases adapted to store transaction data relating to management of configuration data. In one exemplary embodiment of the invention, database 101 includes a notification status database DC_A write partition allocated to data center A and a notification status database DC_B write partition allocated to data center B. The notification status database DC_A write partition includes three replicas, namely notification status database DC_A replicas 1, 2, and 3, in which replica 1 is allocated to data center A and replicas 2 and 3 are allocated to data center B. Likewise, the notification status database DC_B write partition also includes three replicas, namely notification status database DC_B replicas 1, 2, and 3, in which replica 1 is allocated to data center B and replicas 2 and 3 are allocated to data center A. According to this exemplary embodiment of the invention, a transaction relating to management of configuration data in data center A is written into the notification status database DC_A write partition and then reflected in the notification status database DC_A replicas 1, 2, and 3. Similarly, a transaction relating to management of configuration data in data center B is written into the notification status database DC_B write partition and then reflected in the notification status database DC_B replicas 1, 2, and 3. As can be seen, by allocating some of the notification status database DC_A replicas to data center B (e.g., the notification status database DC_A replicas 2 and 3) and some of the notification status database DC_B replicas to data center A (e.g., the notification status database DC_B replicas 2 and 3), a data management transaction occurring in data center A is apparent to data center B, and a transaction occurring in data center B is transparent to data center A. Such an arrangement of configuration and notification status databases advantageously allows collaboration of different data centers in managing configuration data.

It should be noted that even though in FIG. 1, the notification status databases and configuration databases are illustrated to be within database 101, it is contemplated that any particular notification status database or configuration database may be located within or remotely from database 101.

As described, environment 100 includes a data center A and a data center B. According to an exemplary embodiment of the invention, data center A includes an authentication server 102 executing a login service and a profile server 104 executing a registration service and a member service. Data center B also includes an authentication server 106 and a profile server 108. The authentication server 106 of data center B, similar to the authentication server 102 of data center A, executes the login service. The profile server 108 of data center B, similar to the profile server 104 of data center A, executes the registration service and the member service. As such, in this exemplary embodiment of the invention, the same service may be allocated to servers in different data centers.

According to one embodiment of the invention, a user may through an interface component 110 enter requests to manage configuration data of a server or group of servers locating within data center A or B. The interface component 110 may be a user interface or a graphical user interface (GUI) and is shown in FIG. 1 as locating within both data centers A and B for convenience. But it is to be understood that interface component 110 may be located on a machine remotely from the data centers. In this embodiment of the invention, the user may first login into interface component 110 using a user identifier and/or a password. According to another embodiment of the invention, after receiving the user identifier and/or password, interface component 110 then queries an authorization system to authenticate the user and assign a number of functions that the user may utilize in managing configuration data. The authorization system is adapted to store data relating to an authorization role of the user. The authorization role of the user determines what actions the user may perform with respect to configuration data and is a collection of authorization claims, which are defined based on permissions to create, read, update, delete, or execute configuration data. The authorization role of the user also determines which information or data that the user cannot access.

In an exemplary embodiment, the authorization claims are further defined by concatenating a basic operation name with a type of network object. For instance, if the network environment includes an object of type "DeploymentGroup," the following authorization claims can be created: createDeploymentGroup, readDeploymentGroup, updateDeploymentGroup, deleteDeploymentGroup, and executeDeploymentGroup. In this instance, if the authorization role of the user includes the following authorization claims: createDeploymentGroup and readDeployment Group, the user is permitted to create and read configuration data of the Deployment Group but not permitted to update, delete, or execute configuration data of the Deployment Group. In another exemplary embodiment of the invention, the authorization system may provide one or more of the following authorization roles: an authorization role to change configuration data of a front-end server, an authorization role to change configuration of a back-end server, an authorization role to change configuration data of a monitoring server, or an authorization role to view configuration data of a server. The authorization system is adapted to provide interface component 110 with a set of authorization roles and claims and may offer support for backup and restore of data included in the authorization system to or from an extensible markup language (XML) file.

According to one embodiment of the invention, after the user is authenticated by the authorization system and is assigned an authorization role, the user may via an interface component 110 define topology data indicating a relationship among a server, service, server group, service class, and/or configuration data (e.g., a parent-child relationship). The topology data may then be stored in the configuration databases for later retrieval by the user. According to another embodiment of the invention, the user may decide to manage or change a particular configuration object on servers in both data centers A and B. For example, the user may enter a request via the interface component 110 to override the default event throttling parameters on servers in data center A (i.e., authentication server 102 and profile server 104) and servers in data center B (i.e., authentication server 106 and profile server 108). The interface component 110 may then submit the request to database 101 via a scriptable API 112 adapted to access database 101.

After receiving the request to override the default event throttling parameters, the scriptable API 112 may store one or more of the following information in a record of the notification status databases: a time stamp indicating a time that the request to change the configuration data is received, target configuration data, or a server affected by a change in the configuration data. The user may then later query or search the notification status databases for the stored information.

In one embodiment, the scriptable API 112 creates an instance of the target event throttling parameter, called configuration object A. The scriptable API 112 further creates another instance of the target event throttling parameter, called configuration object B. According to one embodiment of the invention, scriptable API 112 creates or modifies the topology data such that both the configuration objects A and B are placed in an entity field and a property field of the configuration databases. Furthermore, the topology data is created or modified by placing entries in an entity relationship field of the configuration databases such that configuration object A is part of a server group A and that configuration object B is part of a server group B, wherein the server group A includes servers in data center A and server group B includes servers in data center B. As a result of such an entity relationship between configuration object A and server group A, configuration object A is also recorded in the entity relationship field as part of authentication server 102 and profile server 104, since authentication server 102 and profile server 104 both belong to server group A. Similarly, since authentication server 106 and profile server 108 belong to server group B, configuration object B is recorded in the entity relationship field as part of both authentication server 106 and profile server 108. In an embodiment of the invention, scriptable API 112 also enters one or more of the following information in a field of the configuration databases: a description of the request to change the event throttling parameters, an identification of the user who submitted the request, the time that the request is submitted, modifier information, or a time to execute the request.

After scriptable API 112 completes submission of the request to database 101, interface component 110 may proceed to query the configuration databases to find out a server affected by the change in the configuration data. In the example illustrated in FIG. 1, database 101 returns authentication servers 102 and 106 and profile servers 104 and 108 to interface component 110. The interface component 110 then may create a notification manifest (e.g., implemented as an XML object) identifying the affected servers. In one exemplary embodiment of the invention, interface component 101 may embed the notification manifest within a notification implemented as a notification trigger and submit the notification trigger to database 101 for storage.

As illustrated in FIG. 1, data center A includes a notification server 114. The notification server 114 is adapted to query database 101 to determine if a notification trigger is stored in database 101. If it is determined that a notification trigger exists, notification server 114 checks a processed task field of the notification status databases to determine if another notification server of data center A has already processed the notification trigger. If the notification trigger has not been processed, notification server 114 then submits an entry to the processed task field indicating that the notification trigger is being processed. In addition, notification server 114 may also submit an entry to a task status log field of the notification status databases to indicate that the notification is being sent to the affected servers in data center A.

Similarly, data center B includes a notification server 116 adapted to query database 101 to determine if a notification trigger exists. If a notification trigger exists in database 101 and if another notification server of data center B has not processed the notification trigger, then notification server 116 submits an entry to the processed task field indicating that the notification trigger is being processed. The notification server 116 may further submit another entry to the task status log field indicating that the notification is being sent to the affected servers in data center B.

According to one embodiment of the invention, authentication server 102 of data center A includes a cache manager service 118. The notification server 114 notifies the cache manager service 118 of the change in the configuration data and submits the notification manifest to cache manager service 118. As one exemplary embodiment of the invention, the notification manifest may be sent to a cache manager service via an electronic mail message, hypertext transmission protocol (HTTP), or other protocols. In one embodiment, the submission of the notification manifest is via a secure interface (e.g., secure distributed component object model (Secure-DCOM)) with the message encrypted. Cache manager service 118 then accesses database 101 and submits an entry to the task status log field indicating that authentication server 102 has received the notification. According to the embodiment of the invention, cache manager service 118 processes the notification manifest and identifies the change in the configuration data (i.e., the change in the event throttling parameter). Cache manager service 118 then notifies a cache manager client 120 (e.g., implemented as a software component such as a component object model (COM) component via a dynamic-link library (DLL)) located in authentication server 102 of the change in the configuration data. A cache manager service and one or more cache manager clients of a particular server may be hereinafter referred to as a cache manager for the particular server. And there may be one cache manager service per server, and one cache manager service may communicate with one or more cache manager clients located on the server.

Following being notified of the change in the event throttling parameter, the cache manager client 120 executes the change in the event throttling parameter for the login service of authentication server 102. In one exemplary embodiment of the invention, cache manager client 120 executes the change in the event throttling parameter by applying the change in a cache for the login service located in authentication server 102. After cache manager client 120 successfully executes the change in the event throttling parameter, cache manager service 118 submits an entry to the task status log field of the notification status databases indicating that the change in the configuration data has been executed successfully as well as a time of the execution. On the other hand, if cache manager client 120 fails to execute the change, cache manager service 118 may submit an entry to the task status log field indicating such a failure.

Also shown in FIG. 1, profile server 104 of data center A includes a cache manager service 122 adapted to receive the notification manifest from notification server 114. After receiving the notification manifest, the cache manager service 122 submits an entry to the task status log field indicating that profile server 104 has received the notification. Cache manager service 122 is also adapted to process the notification manifest to identify the requested change in the event throttling parameter. Cache manager service 122 then notifies a cache manager client 124 located in profile server 104 of the change in the event throttling parameter. The cache manager client 124 is adapted to execute the change for the registration service of profile server 104 (e.g., by applying the change to a cache for the registration service). Cache manager service 122 further notifies a cache manager client 126 of the change in the event throttling parameter. The cache manger client 126 is adapted to execute the change for the member service of profile server 104 (e.g., by applying the change to a cache for the member service). And cache manager service 122 may submit an entry to the task status log field of the notification status databases indicating whether the change in the configuration data has been executed successfully for the registration service and/or the member service of profile server 104. A time of execution for the registration service and/or the member service may also be submitted to the task status log field.

Similar to data center A, authentication server 106 of data center B also includes a cache manager service 128 adapted to receive the notification manifest from notification server 116. The cache manager service 128 is adapted to submit an entry to the task status log field indicating that authentication server 106 has received the notification and is adapted to process the notification manifest to identify the requested change in the event throttling parameter. A cache manager client 130 of authentication server 106 is adapted to execute the change in the event throttling parameter for the login service of authentication server 106. Also illustrated in FIG. 1, profile server 108 includes a cache manager service 132 adapted to receive the notification manifest from notification server 116. The cache manager service 132 is adapted to submit an entry to the task status log field indicating that profile server 108 has received the notification and is adapted to process the notification manifest to identify the requested change in the event throttling parameter. A cache manager client 134 is adapted to execute the change in the event throttling parameter for the registration service of profile server 108. And a cache manager client 136 is adapted to execute the change in the event throttling parameter for the member service of profile server 108. Both cache manager services 128 and 132 are adapted to submit an entry to the task status log field indicating whether the change in the event throttling parameter for the affected servers and services has been executed successfully as well as a time of the execution.

According to one embodiment of the invention, a request to change configuration data may be accompanied by a scheduled time that the change in the configuration data is to be executed. For example, the user may specify to interface component 110 that the change is scheduled to be effective one week from now. In such a scenario, the cache manager clients may execute the change in the configuration data in accordance with the user-specified time. In this embodiment of the invention, the task status log field of the notification status databases may indicate a state of the change in the configuration data. In one exemplary embodiment, the possible states of the change in the configuration data are: unscheduled (i.e., the change was submitted but has not been scheduled), pending (i.e., the change is scheduled to occur at a future time), backlog (i.e., the time of execution has come but the change has not been executed), percent completed (i.e., a percentage of the change in the configuration data that is completed), executed (i.e., the execution time is logged), failed (i.e., a problem occurred and the change failed during execution), and canceled (i.e., the user decides to cancel the change).

In another embodiment of the invention, a request to change configuration data may be accompanied by a request to recur execution of the change in the configuration data. For example, the user may specify that the change should be executed once a week. In this scenario, the cache manager clients may also execute the change in the configuration data in accordance with the user-specified recurrence. According to yet another embodiment of the invention, a request to change configuration data may be accompanied by a specified number of servers to be executed at a time. For example, if 250 affected servers are identified, the user may specify that the change in the configuration data should be applied to 10 servers at a time, until the 250 affected servers are executed with the change. In this case, the cache manager clients may execute the change in the configuration data in accordance with the user-specified number.

In one embodiment of the invention, the user may instruct interface component 110 to query the task status log field of the notification status databases to determine the notification status and the state of the requested change in the configuration data. In this embodiment, interface component 101 may query the notification status databases via scriptable API 112.

Figure 2:
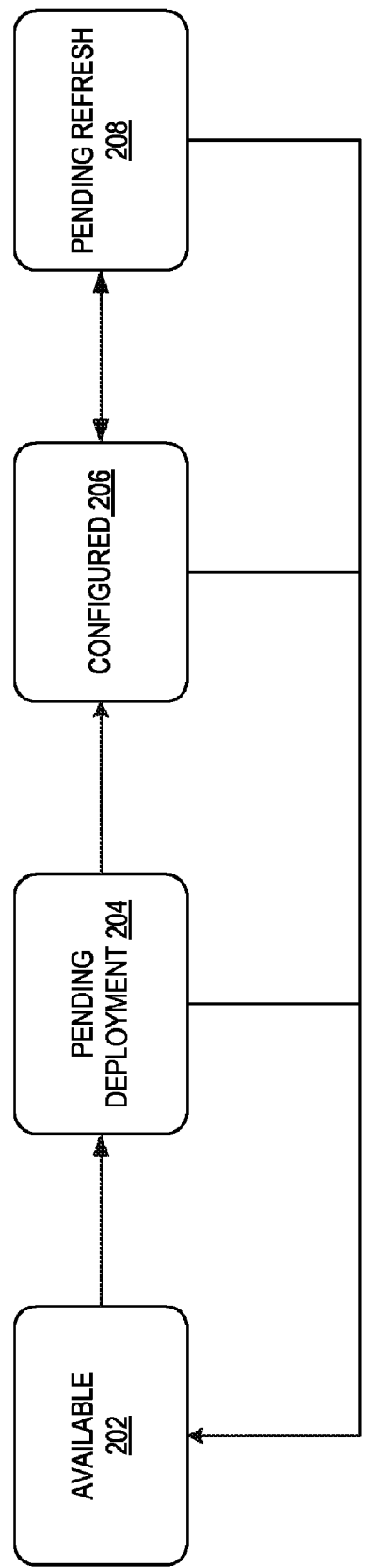
FIG. 2 is a flow diagram of an exemplary embodiment illustrating operational states of a client according to the invention.

It is noted that a particular request to manage configuration data of a server or service may represent a variety of scenarios. In one embodiment of the invention, the request may represent an instruction to change an operational state of one or more servers. By changing configuration data of a particular server, the user may change an operational state of the server. FIG. 2, which is generally indicated by reference character 200, illustrates four exemplary possible operational states of a server according to one embodiment of the invention. At 202, the operational state of the server is "available," meaning that the server is currently not executing a service. A server in the "available" configuration state may be transitioned into a "pending deployment" state of 204, which means that the server is about to be deployed into service, by effecting operational parameters of the server. After the server is ready for deployment (i.e., in the "pending deployment" state), the user may execute a change in configuration data on the server to set up the server for service execution. After the server is set up for service execution and is in a "configured" state as indicated at 206, the user may further submit a request to change the configuration data of the server. While the request is still pending (i.e., not yet executed), the server is in a "pending refresh" state, as indicated at 208. After the instruction to change the configuration data is executed, the server is transitioned back to the "configured" state. As FIG. 2 further shows, the user may transition the server from the "pending deployment," "configured," or "pending refresh" state to the "available" state by executing configuration data changes that remove the operational parameters of the server. In one embodiment, the operational state of the server is stored in a database (e.g., in a configuration or notification status database) for the user to query the operational state of the server. It should be noted that the described operational states of a server is similarly applicable to other types of clients such as services, application programs, or operating system components.

The request to manage configuration data may also represent a request to change a configuration state of a server. In one embodiment of the invention, when configuration data is changed for a particular server, a new configuration state is created with a corresponding version number. The new configuration state and its corresponding version number are stored in the configuration databases as a "delta" configuration state. If the "delta" configuration state operates on the server without a problem for a period of time, the "delta" configuration state may then be marked as a "complete" configuration state, from which further "delta" configuration states may be derived. The configuration databases may store data representing a number of "delta" and/or "complete" configuration states of the server. If existing configuration data of the server runs into problems, the user may access the configuration databases to identify the "delta" and/or "complete" configuration states of the server. The user may then rollback/roll-forward the server from an existing configuration state to a "delta" or "complete" configuration state. In one embodiment of the invention, if the user decides to rollback/roll-forward the server to a "complete" configuration state, the configuration data associated with the "complete" configuration state is executed on the server to achieve the change in the configuration state. In an alternative embodiment of the invention, if the user decides to rollback/roll-forward the server to a "delta" configuration state, then the configuration data associated with the "delta" configuration state is executed on the server if the "delta" configuration state is an immediate predecessor of the existing configuration state. Accordingly, by storing configuration states of the server in the configuration databases, embodiments of the invention effectively allows the user to redo or undo configuration data changes.

In yet another embodiment of the invention, the request to manage configuration data may represent a request to configure a monitoring server in order to monitor one or more other servers. According to an exemplary embodiment of the invention, the user may query a database to identify a server having an "available" operational state. The user may then submit a request to configure the "available" server into a monitoring server. After the server is configured as a monitoring server, it may execute a monitoring service to monitor a server or group of servers. In one embodiment of the invention, the topology data stored in the configuration databases may define a monitoring server group, which includes a number of monitoring servers executing a monitoring service. The user may then query the configuration databases for a list of available monitoring servers in order to monitor one or more other servers.

Notification Server

Figure 3:
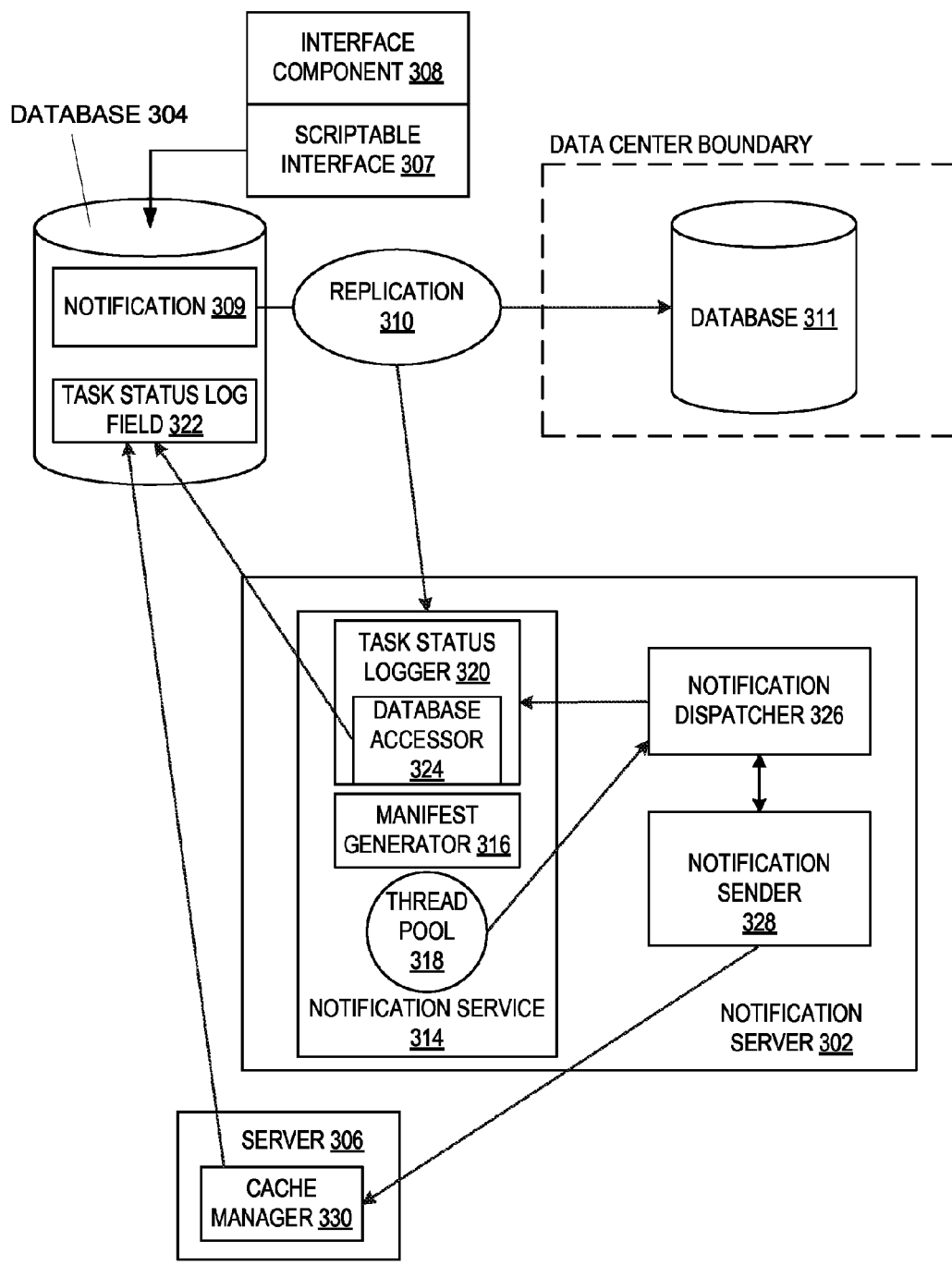
FIG. 3 is a block diagram of an exemplary embodiment of a notification server according to the invention adapted to notify a change in configuration data.

Referring now to FIG. 3, an exemplary environment 300 according to one embodiment of the invention generally shows exemplary interactions between a notification server 302, a database 304, and a server 306. Via a scriptable interface 307, a user uses an interface component 308 to submit a request to change configuration data to the database 304. The database 304 returns a transaction identifier identifying the request to change the configuration data. A scriptable API generates a notification manifest with an identifier matching the transaction identifier and submits to database 304 a notification trigger (e.g., a notification 309) having the notification manifest as a property. As illustrated in FIG. 3, after the notification trigger is stored in database 304, a replication 310 is submitted from database 304 to a database 311 located at another data center to reflect the change of topology data stored in database 304.

According to one embodiment of the invention, notification service 314 polls for an unprocessed notification trigger within a time interval. Information with respect to this time interval is stored in database 304. Notification Service 314 further checks if the notification trigger has been flagged as processed in database 304. If the notification trigger has not been processed, a manifest generator 316 of notification service 314 uses the object identifier and/or the transaction identifier of the notification trigger to obtain the notification manifest from database 304.

After the notification manifest is obtained, notification service 314 accesses database 304 to flag the notification trigger as being processed. The notification service 314 then initializes a thread pool 318 and an associated queue to process the notification manifest. And notification service 314 may initialize a task status logger 320 adapted to write the results of notification processing and delivery in a task status log field 322 of database 304 using a database accessor 324. The thread pool 318 receives the notification manifest from manifest generator 316 and applies an optional extensible stylesheet language (XSL) template to the notification manifest as a preprocessing step. The XSL template is directed to the specific data center where notification service 314 is located and is intended to filter out a server that is not located within the specific data center.

According to one embodiment of the invention, after the notification manifest is placed in the processing queue of thread pool 318, thread pool 318 sends the notification manifest to a notification dispatcher 326. The notification dispatcher 326 is adapted to distill the notification manifest into several individual notification manifests and to manage a list of notification senders such as a notification sender 328. The notification dispatcher 326 is further adapted to route the individual notification manifests to appropriate notification senders based on the content of the notification manifests. If the user has specified a number of servers to be executed with a configuration data change at a time, notification dispatcher 326 is adapted to hold the notification manifests until the number of servers has been notified of the configuration data change.

After receiving a notification manifest from notification dispatcher 326, the notification sender 328 is adapted to abstract the details of the notification delivery and to deliver the notification manifest to a cache manager 330 of the server 306. In one embodiment, the delivery may be via HTTP over secure sockets layer (SSL). After notification sender 328 has completed (or failed) delivery of the notification manifest to server 306, notification sender 328 may send a result of the delivery to task status logger 320 via notification dispatcher 326. The task status logger 320 in turn uses the database accessor 324 to access database 304 and to submit an entry to the task status log field 322 to indicate the status of the notification. According to another embodiment of the invention, the cache manager 330 includes a cache manager service and one or more cache manager clients to process and execute the notification manifest for a particular service hosted on server 306. The cache manager 330 of server 306 is also adapted to submit an entry to task status log field 322 of database 304 to indicate the execution status.

Cache Manager

Figure 4:
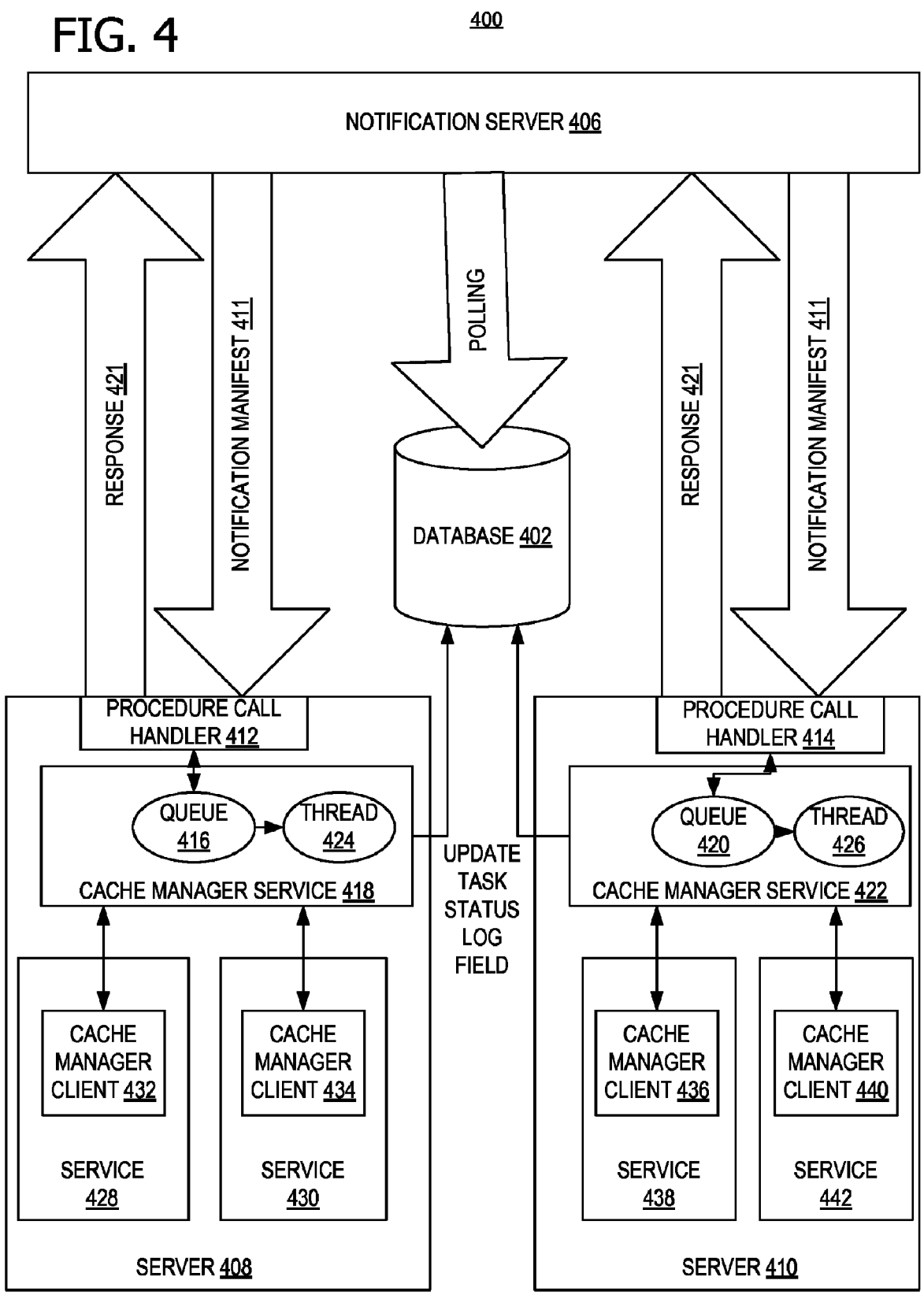
FIG. 4 is a block diagram of an exemplary embodiment of a cache manager service (or cache service) and a cache manager client (or cache client) according to the invention adapted to receive a notification to change configuration data and to execute a change in the configuration data.

FIG. 4 shows generally an exemplary environment 400 according to one embodiment of the invention in which a cache manager service is adapted to receive a notification to change configuration data and in which a cache manager client is adapted to execute a change in the configuration data. As shown in FIG. 4, a database 402 is polled by a notification server 406 for an unprocessed notification in a time interval. After receiving the unprocessed notification, notification server 406 determines that it needs to notify a server 408 and a server 410 of the change in the configuration data. The notification server 406 sends notification manifests 411 as interface calls representing one or more processing commands to the servers 408 and 410. The interface calls are issued synchronously to servers 408 and 410 in order to provide a quick response time for notification server 406 to process and transmit subsequent notification manifests. In one embodiment, cache manager services 418 and 422 are adapted to authenticate the interface calls to verify that the packets are sent from notification server 406. And the interface calls themselves are adapted to verify that cache manager services 418 and 422 are the intended recipients of notification manifests 411. After cache manager services 418 and 422 are verified as intended recipients, they may then later impersonate service credentials during callbacks for cache updates or status gathering. The servers 408 and 410 respectively include a procedure call handler 412 and a procedure call handler 414 (e.g., a remote procedure call server service (RPCSS)) to receive and handle notification manifests 411. According to one embodiment of the invention, a cache manager service 418 of server 408 and/or a cache manager service 422 of server 410 may parse notification manifests 411 to obtain a trigger identifier of notification manifests 411. In this embodiment, a simple API for XML (SAX) may be utilized to parse notification manifests 411, which may be XML objects. The notification manifests 411 are then placed in a circular queue 416 in the cache manager service 418 and/or in a circular queue 420 in the cache manager service 422.

After notification manifests 411 are queued, cache manager services 418 and/or 422 may submit an entry to a task status log field of database 402 to indicate that servers 408 and/or 410 have received notification manifests 411. The task entries in the task status log field may be keyed using the trigger identifier, or alternatively, may be keyed using a transaction identifier, a data center identifier, a server identifier, and/or a service identifier associated with notification manifests 411. In addition, cache manager service 418 and/or 422 may send responses 421 back to notification server 406 to indicate the queuing status of notification manifests 411 and whether a trigger identifier has been obtained from notification manifests 411 in order to update the task status log field. The circular queues 416 and 420 are adapted to enable the interface calls to be subsequently processed in the receiving order without holding up the responses 421 back to notification server 406.

In one exemplary embodiment of the invention, a processing thread 424 of cache manager service 418 and/or a processing thread 426 of cache manager service 422 receive notification manifests 411 represented as XML objects from circular queues 416 and/or 420. The processing threads 424 and/or 426 then parse the XML objects to identify a command issued by a user. In one particular example, the command may be (1) a service reset command for restarting or rebooting one or more services on servers 408 and/or 410; (2) a service start/stop command for starting or stopping one or more services on servers 408 and/or 410; (3) a cache refresh command for updating one or more properties, entity relationships, and/or entities in a cache; (4) a cache refresh all command for invalidating a cache and importing configuration data to the cache; or (5) a get cache status command for obtaining the status of an entity in a cache. The command may also specify an effective time of the command, a number of servers to be executed at a time, and if the command is recurring. An exemplary XML schema for a service reset command, which resets a login service of an authentication server and a member service of a profile server, is as follows:

```
<CommandList>
  <triggerid>123456789012345</triggerid>
  <targetserverid>123123123123123</targetserverid>
  <command>
  <name>ServiceReset</name>
  <id>22222222222222222</id>
  <progid>CacheManagerCommands.-
CacheManagerCommandsServiceReset.1</progid>
  <services>
  <service webservice = "Login Service">Authentication
Server</service>
  <service webservice = "Member Service">Profile Server</service>
  </services>
  </command>
</CommandList>
```

After cache manager services 418 and/or 422 parse notification manifests 411 to find out what command is issued, cache manager services 418 and/or 422 then notify a cache manager client registered with cache manager services 418 and/or 422 to execute the command for the affected services. In the example illustrated in FIG. 4, a service 428 and a service 430 of server 408 are affected by the issued command, and as a result, cache manager service 418 notifies a cache manager client 432 maintained by the service 428 and a cache manager client 434 maintained by the service 430 of the issued command. Similarly, cache manager service 422 notifies a cache manager client 436 maintained by the service 438 and a cache manager client 440 maintained by the service 442 of the issued command.

After receiving notification of the command, a cache manager client checks to see if the issued command is a preloaded configuration object. For example, the cache manager services 418 and/or 422 may have loaded object types and kept them in their process memory such that when a cache manager client registers to the cache manager services 418 and/or 422 (e.g., using DCOM), cache manager services 418 and/or 422 would write object type information into a stream for delivery to the cache manager client. If the issued command is a preloaded configuration object, the cache manager client, at the effective time of the command, creates the corresponding configuration object based on the object type attribute of the object type obtained from the command and then include the configuration object to a cache of an affected service. The cache manager client then calls a callback method to handle post refresh, post load processing (e.g., decoding XML blob or decrypt encrypted data), etc. This helps the cache manager client to avoid accessing database 402 to obtain object type information. If the issued command is not a preloaded configuration object, the cache manager client checks to see if the configuration object has already been cached, and if so, invalidates the configuration object at the effective time of the command and calls the callback method to handle post refresh, post load processing, etc. Otherwise, the cache manager client may ignore the command.

After the issued command is executed for the affected services, cache manager services 418 and/or 422 may submit an entry to the task status log field of database 402 to indicate if the command is still pending (e.g., when a reboot or restart is happening), completed, or failed. The processing threads 424 and/or 426 may then request for next notification manifests from circular queues 416 and/or 420. If there are additional notification manifests, processing threads 424 and/or 426 may parse the XML objects as described above.

In one embodiment of the invention, if notification manifests 411 include multiple commands, and the processing fails after some commands have been executed for a service, the cache manager client may stop processing subsequent commands and leave the already-made changes in the cache. Furthermore, the cache manager client is responsible for reference counting a cache object and for locking the cache object to achieve thread safety. Moreover, it is preferable that read/write locks are applied both to the cache and to an object instance stored in the cache in order to achieve a level of concurrency.

Network Device Proxy

Figure 5:
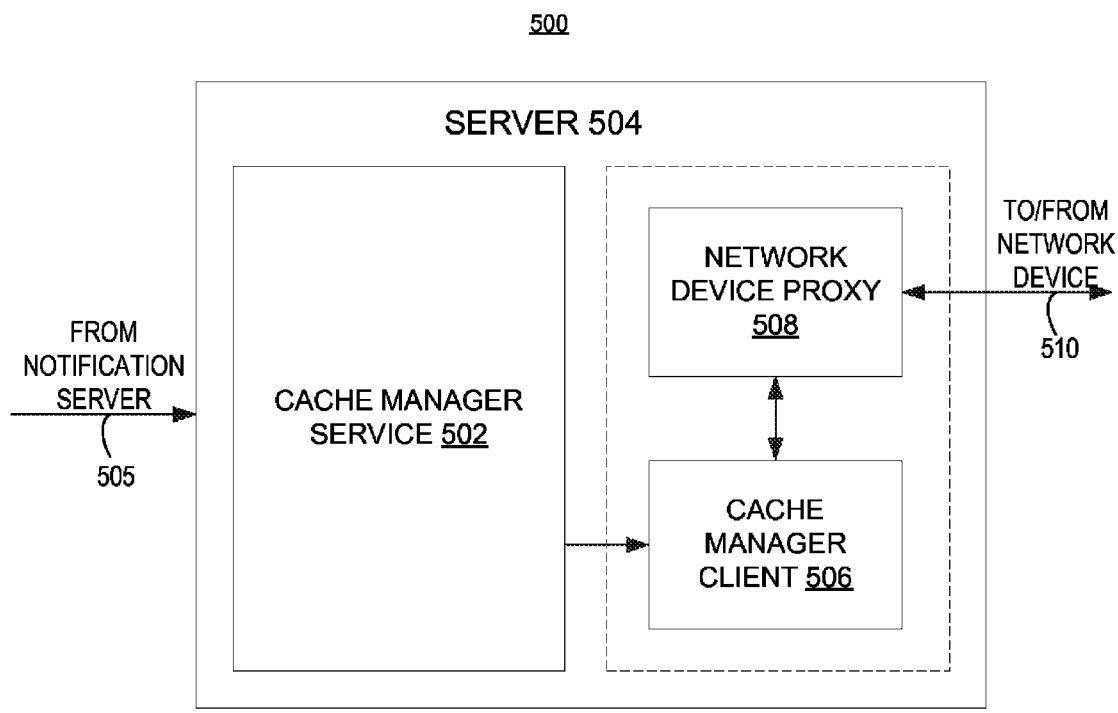
FIG. 5 is a block diagram of an exemplary embodiment of a client having a network device proxy according to the invention adapted to notify a network device of a change in configuration data.

FIG. 5 shows generally an exemplary environment 500 according to one embodiment of the invention for notifying a network device to take servers/services in or out of rotation for maintenance. As illustrated, a cache manager service 502 (e.g., a software component such as a COM component) of a server 504 receives a notification of the change in the configuration data from a notification server, as indicated by an arrow 505. The cache manager service 502 is further adapted to notify a cache manager client 506 (e.g., a software component such as a COM component) of the change in the configuration data in order for the cache manager client 506 to execute the change for a particular service executed on server 504. The cache manager client 506 is also adapted to notify a network device proxy 508 (e.g., a software component such as a COM component) of the change in the configuration data. In this case, the configuration data change is that some servers/services are placed in a pending in or out of rotation state. The network device proxy 508 is further adapted to notify a network device located in the data center where server 504 is located of the configuration data change, as indicated by an arrow 510. Network device proxy 508 will then instruct the network device will to take the intended servers/services in or out of rotation in an asynchronous fashion to prevent system resource of server 504 from being tied up for a relatively long period due to the possibility that the network device is unresponsive. According to one embodiment of the invention, network device proxy 508 will also poll the network device within a time interval for the actual in/out of rotation status of server 504. Upon receiving the rotation status, network device proxy 508 will then confirm the in/out of rotation state of server 504 by updating a configuration database, thus completing the loop.

APPENDIX A provides specific examples of configuration data management according to embodiments of the invention.

Exemplary Operating Environment

Figure 6:
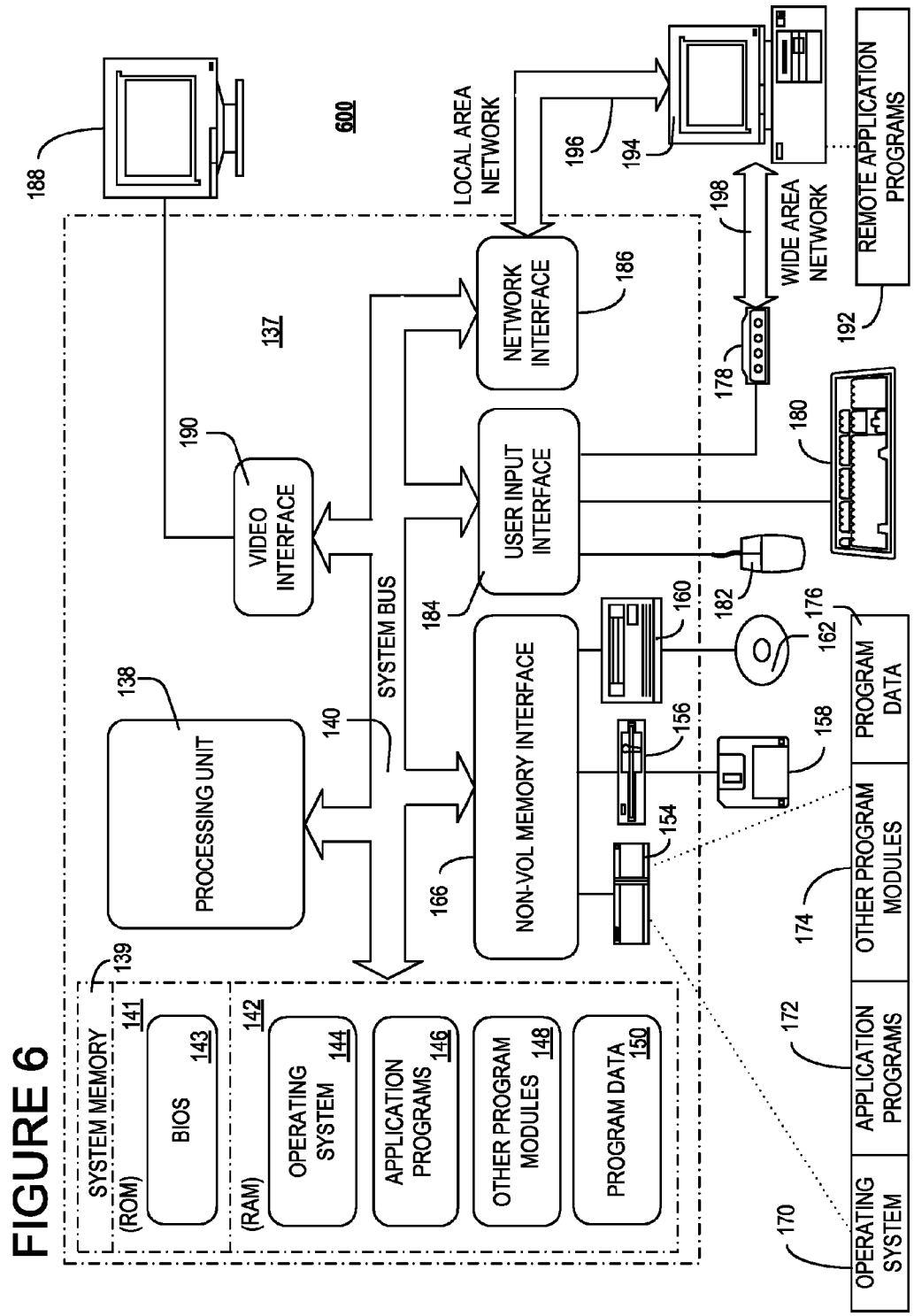
FIG. 6 is a block diagram illustrating an exemplary embodiment of a suitable computing system environment in which one embodiment of the invention may be implemented.

FIG. 6 shows one example of a general purpose computing device in the form of a computer 137. In one embodiment of the invention, a computer such as the computer 137 is suitable for use in authentication servers 102 and 106, profile servers 104 and 108, interface component 110, notification servers 114, 116, 302, and 406, servers 306, 408, 410, and 504, or any other figures illustrated and described herein. Computer 137 has one or more processors or processing units 138 and a system memory 139. In the illustrated embodiment, a system bus 140 couples various system components including the system memory 139 to the processors 138. The bus 140 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 137 typically has at least some form of computer readable media. Computer readable media, which include both volatile and nonvolatile media, removable and non-removable media, may be any available medium that can be accessed by computer 137. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 137. Communication media typically embody computer readable instructions, data structures, program modules, or other data in a modulated data signal such as a carrier wave or other transport mechanism and include any information delivery media. The modulated data signal has one or more of its characteristic set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 139 includes computer storage media in the form of removable and/or non-removable, volatile and/or nonvolatile memory. In the illustrated embodiment, system memory 139 includes read only memory (ROM) 141 and random access memory (RAM) 142. A basic input/output system 143 (BIOS), including the basic routines that help to transfer information between elements within computer 137, such as during start-up, is typically stored in ROM 141. RAM 142 typically includes data and/or program modules that are immediately accessible to and/or presently being operated on by processing unit 138. By way of example, and not limitation, FIG. 6 illustrates operating system 144, application programs 146, other program modules 148, and program data 150.

The computer 137 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 140 by a non-volatile memory interface, such as interface 166.

The drives or other mass storage devices and their associated computer storage media discussed above and illustrated in FIG. 6, provide storage of computer readable instructions, data structures, program modules and other data for the computer 137. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 137 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 138 through a user input interface 184 that is coupled to system bus 140, but may be connected by other interface and bus structures, such as a parallel port, game port, or a Universal Serial Bus (USB). A monitor 188 or other type of display device is also connected to system bus 140 via an interface, such as a video interface 190. In addition to the monitor 188, computers often include other peripheral output devices (not shown) such as a printer and speakers, which may be connected through an output peripheral interface (not shown).

The computer 137 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 137. The logical connections depicted in FIG. 6 include a local area network (LAN) 196 and a wide area network (WAN) 198, but may also include other networks. LAN 140 and/or WAN 141 can be a wired network, a wireless network, a combination thereof, and so on. Such network environments are commonplace in offices, enterprise-wide computer networks, intranets, and global computer networks (e.g., the Internet).

When used in a local area network environment, computer 137 is connected to the LAN 196 through a network interface or adapter 186. When used in a wide area network environment, computer 137 typically includes a modem 178 or other means for establishing communications over the WAN 198, such as the Internet. The modem 178, which may be internal or external, is connected to system bus 140 via the user input interface 184, or other appropriate mechanism. In a networked environment, program modules depicted relative to computer 137, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 137 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. But it is recognized that such programs and components reside at various times in different storage components of the computer, and are executed by the data processor(s) of the computer.

Although described in connection with an exemplary computing system environment, including computer 137, one embodiment of the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a data communication network. In a distributed computing environment, program modules may be located in both local and remote computer storage media including memory storage devices.

In operation, computer 137 executes computer-executable instructions such as those illustrated in FIGS. 1-5 to process a configuration data change. A request to implement a change in configuration data is received from a user. The configuration data relates to an operation of a client. The received request is stored in a memory area. Computer-executable instructions request topology data from the memory area based on the configuration data to identify the client. The requested topology data is received from the memory area. Computer-executable instructions identify a notification service associated with the client and notify the identified notification service of the change in the configuration data.

Exemplary Programming Interfaces

An interface (such as the scriptable API described herein) in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, COM interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or DCOM examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

Remarks

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "containing," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of embodiments of the invention, it is intended that all matter contained in the above description and shown in the accompanying drawings shall be interpreted as illustrative and not in a limiting sense.

APPENDIX A

The following provides specific examples of user scenarios according to embodiments of the invention.

Organizing Services and Servers

John manages a set of services grouped together and associated to different URLs. For example, the set of services may be hosted under two domains: login.y.com and login.y.x.com. For a domain, John associates a set of servers. The servers under the domain are hosting the same set of services. Often, John needs to associate slightly different configuration object values for the domains. To ease the management of the domains, John creates groups to represent sets of services and associated servers. He executes the following steps.

In a group copy approach, John selects the appropriate service class and creates a group named "Login." John further associates the following services to the "Login" group: Login Post, Secure Post, Mobile Post, and XML Authentication. He utilizes the default configuration values for the services in the group. John then associates a set of servers to the "Login" group. John can view and select which servers are assigned to which group. He further associates a domain "login.x.com" to the services in the "Login" group. The domain is a configuration object of the services in the group. More than one domain can also be associated with a particular group. John then places the "Login" group in rotation.

John creates a second group by creating a copy of the group "Login" and naming it "YLogin." This operation copies the associated services and the corresponding configuration values. The new group initially does not include a server. John associates a set of servers to the "YLogin" group. He further associates a domain "login.y.x.com" to the "YLogin" group. Finally, John places the "YLogin" group in rotation. It is noted that applying a configuration data change to one group does not affect the other group.

In a subgroup approach, John creates a group named "Login" and associates the following services to the "Login" group: Login Post, Secure Post, Mobile Post, and XML Authentication. He utilizes the default configuration values for the services in the group. The group "Login" does not include a server and is the base (parent) for subgroups "XLogin" and "YLogin."

John creates a subgroup of the group "Login" named "XLogin." John associates a set of servers to the "XLogin" group. He further associates a domain "login.x.com" to the "XLogin" group. The domain is a configuration object of the services in the group. More than one domain can also be associated with a particular group. John then places the "XLogin" group in rotation.

John creates a second subgroup of the group "Login" and names it "YLogin." John associates a set of servers to the "YLogin" group. He further associates a domain "login.y.x.com" to the "YLogin" group. Finally, John places the "YLogin" group in rotation.

From now on, a configuration data change to the group "Login" is reflected in the subgroups "XLogin" and "YLogin." But applying a configuration data change to one subgroup does not affect the other peer subgroup or the base (parent) group.

Applying a Configuration Data Change

In a group copy approach, a set of configuration data changes is desired for the authentication service. John places a query to determine the affected servers. A collection of servers belonging to groups SOAP, SOAP3, and SOAP4 is returned. John then executes the following steps.

John decides to smoke test changes on a couple of servers currently in the group SOAP3. He creates a new group by copying the group SOAP3 and naming the new group SOAP3_Smoke.

The group SOAP3_Smoke includes services, configuration objects and corresponding values of the group SOAP3. It does not include the associated servers of the group SOAP3 and currently does not include a server. John then changes the desired authentication configuration objects in the group SOAP3_Smoke. John further removes two servers from the group SOAP3 and adds them to the new group SOAP3_Smoke. Finally, he turns on the smoke test traffic on the group SOAP3_Smoke.

After having a few configuration data changes in the smoke test, an emergency patch to be deployed immediately desires configuration data changes to the registration service. John places a query to determine the affected servers. A collection of servers belonging to groups SOAP3, SOAP3_Smoke, and Reg1 is returned. John then executes the following steps.

Since the emergency configuration data changes are to be deployed immediately, John decides not to use the group SOAP3_Smoke to smoke test the changes because that would imply rolling out the configuration data changes included in the group SOAP3_Smoke. Instead, he creates two new groups SOAP3_Smoke-Pri1 and Reg1_Smoke-Pri1, which are copies of the groups SOAP3 and Reg1, respectively. He makes the configuration data changes to the two new smoke groups needed for the patch. Then he assigns two available servers to the new groups and refreshes the servers. The servers are taken from the respective source groups SOAP3 and Reg1. John then turns on the smoke test traffic on them.

After John is satisfied that the smoke test is successful for both groups, he uses SOAP3_Smoke-Pri to overwrite the configuration objects in the groups SOAP3_Smoke and SOAP3. After he has verified that the changes have occurred, he proceeds to overwrite the configuration objects in the groups Reg1 and Reg2 with the configuration objects in the group Reg1_Smoke-Pri1. John then moves the servers back to their original groups. He then deletes the groups SOAP3_Smoke-Pri and Reg1_Smoke-Pri.

The result is that the affected servers now have the emergency changes applied, including the servers currently in the smoke test.

In a subgroup approach, a set of configuration data changes is desired for the authentication service. John places a query to determine the affected servers. A collection of servers belonging to groups SOAP3 and SOAP4 is returned. John then executes the following steps.

John decides to smoke test changes on a couple of servers currently in the group SOAP3. He creates a new group by making a subgroup of SOAP3 and naming it SOAP3_Smoke. So John creates a hierarchy where the subgroup SOAP3_Smoke is a child of the group SOAP3. From now on, a configuration data change applied to the parent group is reflected in the child group (subgroup). The new subgroup has the same services and configuration objects of the parent group with the exception that it currently does not include a server. John then changes the desired authentication configuration objects in the group SOAP3_Smoke. A change made to the child group does not affect the parent group; in other words, the group SOAP3 is not affected. John then removes two servers from the group SOAP3 and adds them to the new group SOAP3_Smoke. Finally, he turns on the smoke test traffic on the new subgroup SOAP3_Smoke.

After having a few configuration data changes in the smoke test, an emergency patch to be deployed immediately desires configuration data changes to the registration service. John places a query to determine the affected servers. A collection of servers belonging to groups SOAP3, SOAP3_Smoke, and Reg1 is returned. John then executes the following steps.

Since the emergency configuration data changes are to be deployed immediately, John decides not to use the group SOAP3_Smoke to smoke test the changes because that would imply rolling out the configuration data changes included in the group SOAP3_Smoke. Instead, he creates two new groups SOAP3_Smoke-Pri1 and Reg1_Smoke-Pri1, which are subgroups of the groups SOAP3 and Reg1, respectively. He applies the configuration object changes needed by the patch to the two new subgroups. Then he assigns two available servers to the new subgroups and turns on the smoke test traffic on them.

After John is satisfied that the smoke test is successful for the subgroups, he uses the group SOAP3_Smoke-Pri to overwrite the configuration objects in the group SOAP3. He does not need to overwrite the group SOAP3_Smoke because this is a child of the group SOAP3, and therefore, the changes for the group SOAP3_Smoke are automatically executed after the changes for the group SOAP3 are executed. After he has verified that the changes have occurred, he proceeds to overwrite the configuration objects in the group Reg1 with the configuration objects in the group Reg1_Smoke-Pri1. John moves the servers from the smoke groups to the group of available servers. Then he deletes the groups SOAP3_Smoke-Pri and Reg1_Smoke-Pri.

The result is that the affected servers now have the emergency changes applied, including the servers currently in the smoke test.

Managing Configuration State

John requests to view the current or past configuration states of a particular server, group of servers, or the network environment in order to troubleshoot issues or to confirm the expected configuration states of one or more configuration objects.

After having the network environment running without a problem for over a week after releasing a version of the login service, John decides to describe the current configuration state as a "complete" configuration state as opposed to a "delta" configuration state.

Shortly after deploying patch #4444, some configuration problems are detected. John decides to rollback the current configuration state (as defined by patch #4444) to the "complete" configuration state. John places a request to do so. Accompanying the request is a description of why the state is rolled back.

Auditing Trails of Configuration Data Changes

After smoke testing a set of configuration settings, John places a request to apply these settings to a group of servers. The request is logged as a record in an audit storage. The record includes basic transaction information such as date and time of the request, user identifier, transaction description including input parameters, affected target resource, and a description of why the request is made (e.g., bug number, patch number, etc.).

A couple of months after changing the configuration settings, questions are brought as to why these changes were made. John places a query to retrieve the requests whose targeted configuration objects are associated with the configuration settings for the last three months. The report shows that the changes were made as part of patch #421 to roll out Version A.

Controlling Propagation of Configuration Data

When deploying patch #4455, John identifies new values for the settings that control the creation of accounts in namespaces on a particular group of servers running the Namespace and Credential SOAP servers. Then John submits a request to refresh the cache data of the affected servers.

A large group of servers may be affected by a configuration data change. Whenever a request is submitted, John specifies a number of servers that can be refreshed at a time to minimize the risk of affecting availability of services. For example, if 300 servers need to be refreshed, John can specify that the refresh be applied to 10 servers at a time until the 300 servers are refreshed.

Managing Servers (Create, Read, Update, Delete, and Execute)

At various times, operations need to create, read, update, delete, or execute a large number of servers. For example, operations may need to update the in-service/out-of-service operational state of one or many servers.

Operations often query a configuration database to generate a list of servers and their current in-service/out-of-service operational states. The queries are generally filtered by the groups that the servers are part of and/or by their operational states.

Event throttling parameter is a configuration object that John can manipulate at a group or server level. In other words, John may decide to have this configuration object set to the same value for the servers in a server group or have a different value for a subset of the servers in the server group.

Managing Monitoring Tasks

John can query to obtain a list of available monitoring servers. Whenever a new monitoring server is setup and ready for operation, it is added to topology data stored in a configuration database.

John may decide to monitor a server or group of servers at a time. John may do so by selecting one or more of the existing groups (or individual servers) and placing a request to monitor them. When placing the request to monitor the servers, John can decide which monitoring server is utilized to monitor the servers.

Scheduling a Configuration Data Change

An unsettling bug is sporadically affecting the creation of profiles, leaving corrupted data in the profile records. A particular debugging configuration value needs to be set so that complete information is gathered whenever this bug shows up again. Since such a setting can affect performance, John decides to set it up during off-peak times. Accordingly, John sends a collection of requests to schedule the changes to turn on and off debugging settings at off-peak times for the next week.

John can manage a batch of scheduled configuration data changes. John can further schedule a new task, update the scheduled time of a task, or cancel a scheduled task. John can also query the state of a scheduled task.

Role-Based Access Control

Configuration data management functions are divided across several teams with clear authorization role definitions. An individual is assigned an authorization role, which encompasses a set of authorization claims over particular configuration resources. The authorization role controls the access to configuration data.

What is claimed is:

1. A system for managing a plurality of clients, said system comprising:
    a memory area adapted to store topology data, said topology data identifying a relationship between the plurality of clients;
    a notification adapted to indicate a change in configuration data, said configuration data relating to an operation of at least one affected client from the plurality of clients;
    a notification service adapted to search the memory area in response to the notification to identify the affected client based on the topology data and to notify the affected client of the change in the configuration data, and
    computer executable instructions for:
        identifying the client affected by the change in the configuration data based on the topology data stored in the memory area;
        generating a notification manifest identifying the client affected by the change in the configuration data;
        generating the notification as a function of the notification manifest; and
        sending the notification to the memory area;
    wherein the memory area is adapted to store the notification, and wherein the notification service is further adapted to access the memory area to receive said notification and to notify said affected client of the change in the configuration data in response to receiving said notification by sending the notification manifest to a cache manager associated with the affected client, wherein the notification manifest is adapted to enable said cache manager to identify and execute the change in the configuration data of the affected client.

2. The system of claim 1, further comprising an interface component adapted to receive a request to change the configuration data.

3. The system of claim 2, further comprising computer-executable instructions to verify that said request to change the configuration data comprises authorization data authorizing the change in the configuration data.

4. The system of claim 2, wherein the interface component comprises a user interface.

5. The system of claim 2, further comprising an application programming interface adapted to provide communication between the memory area and the interface component.

6. The system of claim 1, further comprising the cache manager adapted to receive the notification manifest from the notification service, said notification manifest defining the change in the configuration data and specifying the affected client, said cache manager further adapted to execute the change in the configuration data on the affected client.

7. The system of claim 1, further comprising a second memory area adapted to store data indicating a status of the change in the configuration data.

8. The system of claim 1, wherein said cache manager is adapted to receive the notification manifest and to process the notification manifest to identify the change in the configuration data, said cache manager further being adapted to execute the change in the configuration data on the affected client.

* * * * *